(12) United States Patent
Tanaka et al.

(10) Patent No.: US 7,287,182 B2
(45) Date of Patent: Oct. 23, 2007

(54) METHOD AND APPARATUS FOR COPYING DATA OF DISK DRIVE IN DISK ARRAY SYSTEM

(75) Inventors: Kazuyuki Tanaka, Tachikawa (JP); Takehiko Kurashige, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 554 days.

(21) Appl. No.: 10/945,263

(22) Filed: Sep. 21, 2004

(65) Prior Publication Data

US 2005/0097390 A1 May 5, 2005

(30) Foreign Application Priority Data

Sep. 29, 2003 (JP) ............... 2003-337753

(51) Int. Cl.
*G06F 11/00* (2006.01)
(52) U.S. Cl. ............... 714/7; 714/6
(58) Field of Classification Search ............ 714/7, 714/6
See application file for complete search history.

(56) References Cited

U.S. PATENT DOCUMENTS 5,790,773 A * 8/1998 DeKoning et al. ............ 714/6
6,347,359 B1 * 2/2002 Smith et al. ............... 711/114
6,694,447 B1 * 2/2004 Leach et al. ............... 714/6
2002/0152416 A1 * 10/2002 Fukuda ....................... 714/7
2004/0019824 A1 * 1/2004 McCombs .................. 714/13
2004/0153753 A1 * 8/2004 Yamaguchi et al. ......... 714/13
2004/0236986 A1 * 11/2004 Ng ............................. 714/7
2007/0006023 A1 * 1/2007 Fujibayashi ................. 714/7

FOREIGN PATENT DOCUMENTS

JP  9-269871  10/1997

* cited by examiner

*Primary Examiner*—Marc Duncan
(74) *Attorney, Agent, or Firm*—Pillsbury Winthrop Shaw Pittman, LLP

(57) ABSTRACT

There is disclosed a RAID control apparatus which copies data to a copying-target disk drive from the first or second disk drive by use of a rebuilding function in a disk array system including the first and second disk drives. The RAID control apparatus replaces a disk drive to be copied with the second disk drive, when the first disk drive fails during execution of a copying operation using the first disk drive as the disk drive to be copied.

2 Claims, 3 Drawing Sheets

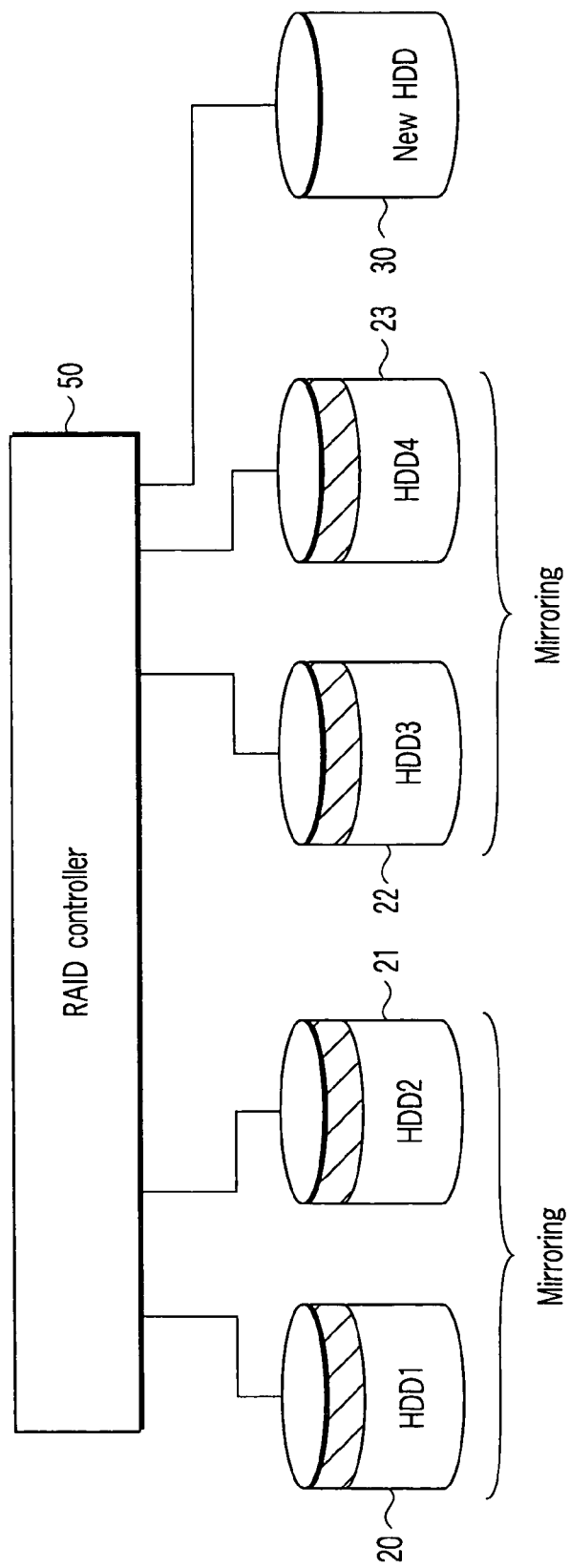
F I G. 5

METHOD AND APPARATUS FOR COPYING DATA OF DISK DRIVE IN DISK ARRAY SYSTEM

CROSS-REFERENCE TO RELATED APPLICATIONS

This application is based upon and claims the benefit of priority from prior Japanese Patent Application No. 2003-337753, filed Sep. 29, 2003, the entire contents of which are incorporated herein by reference.

BACKGROUND OF THE INVENTION

1. Field of the Invention

The present invention generally relates to a disk array system, particularly to a copying technique of preparing a duplicate of a disk drive.

2. Description of the Related Art

In general, as a disk array (RAID: redundant arrays of inexpensive disks) system, a RAID (RAID-0) system including a striping constitution in which data is scattered by a block unit and having level 0, a RAID (RAID-1) system including a mirroring constitution in which the same data is stored in a plurality of disk drives and having level 1 and the like are well known.

A disk array controller (hereinafter referred to as a RAID controller) which realizes a RAID-1 function has a data restoring function called a rebuilding or reconstruction function. By the rebuilding function, data stored in a failed disk drive (HDD) can be restored in a disk drive for replacement.

All the data stored in the existing disk drive is copied into a new disk drive using the rebuilding function, and accordingly a copying function of preparing a duplicate disk drive can be realized. A prior technique has been proposed in which mirroring pairs constituted by a plurality of disk drives are rebuilt using the copying function (see, for example, Jpn. Pat. Appln. KOKAI Publication No. 9-269871).

In the prior technique, when one of the disk drives constituting the mirroring pair having a high priority order fails, a mirroring pair having a low priority order is eliminated, and the disk drive constitutes a new mirroring pair with the disk drive having a high priority order.

In general, when a duplicate disk drive is prepared using the rebuilding function of the RAID controller, one disk drive is forced to fail from a state in which redundancy (optimal) is maintained (constitution of the RAID-1 system), and replaced with a disk drive for copying after a state of non-redundancy (degrade) to execute a duplicating operation (copying operation of all data).

However, in the usual method, the redundancy state is forcibly brought into a non-redundancy state in the constitution of the RAID-1 system. Therefore, when trouble occurs in the existing disk drive as an original of a duplicate, there is a possibility that the disk falls into a situation in which not only duplicate data but also original data cannot be restored.

BRIEF SUMMARY OF THE INVENTION

In accordance with one embodiment of the present invention, there is provided a RAID control apparatus capable of protecting original data even in a case where trouble occurs in a disk drive to be copied, when a duplicate disk drive is prepared.

The RAID control apparatus comprises: an input/output control unit which is connectable to a duplicate disk drive except first and second disk drives included in a disk array system and which controls input/output of data with respect to the first, second, and duplicate disk drives; and a copying control unit to read recording data from a disk drive to be copied which is one of the first and second disk drives and to transfer the data to the duplicate disk drive by use of a rebuilding function of the disk array system.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a block diagram showing a RAID constitution according to another embodiment.

DETAILED DESCRIPTION OF THE INVENTION

An embodiment of the present invention will be described hereinafter with reference to the drawings.

(System Constitution)

Figure 1:
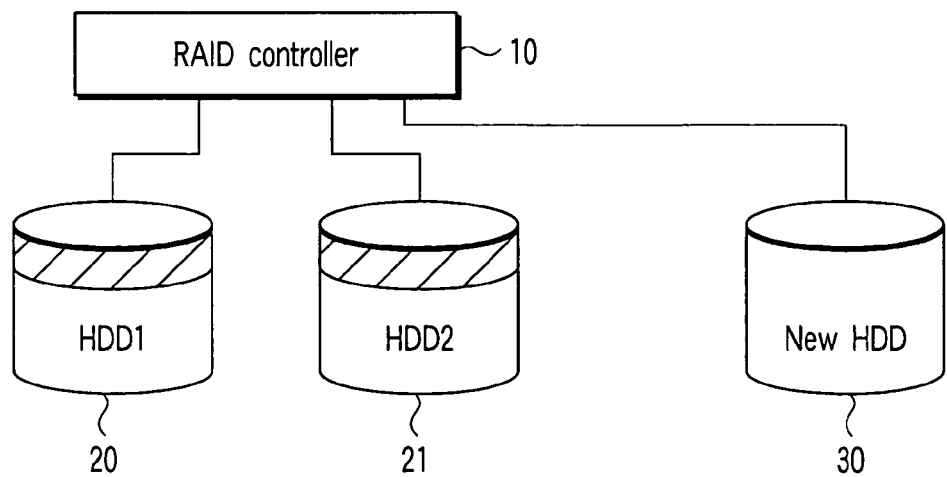
FIG. 1 is a block diagram showing a constitution of a RAID system according to an embodiment of the present invention.
Figure 2:
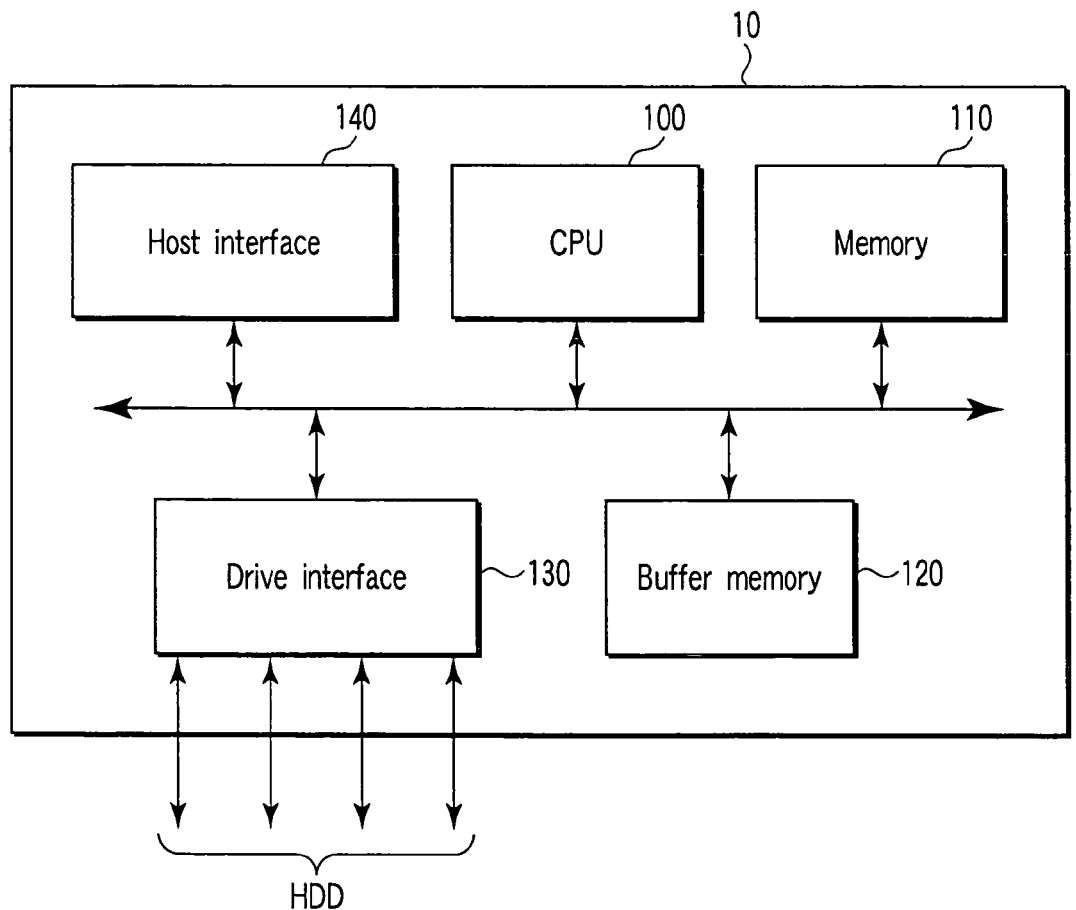
FIG. 2 is block a diagram showing a constitution of a RAID controller according to the present embodiment.

FIG. 1 is a block diagram showing a constitution of a system (disk array system) of redundant arrays of inexpensive disks (RAID) according to an embodiment of the present invention. FIG. 2 is block a diagram showing a constitution of a RAID controller.

As shown in FIG. 1, a RAID controller 10 of the present embodiment is connected to a first disk drive 20 and a second disk drive 21 to constitute a RAID constitution of RAID-1. That is, the first disk drive 20 and second disk drive 21 have a mirroring constitution in which the same data is stored.

It is to be noted that in FIG. 1, slant-line portions of the first disk drive 20 and the second disk drive 21 are reserve areas where RAID set information and the like are stored.

The RAID controller 10 has a copying function of reading recording data from the existing first disk drive 20 or second disk drive 21 and copying the data to a disk drive 30 which is a copying target (sometimes referred to as the new disk drive) to prepare a disk drive for copying by use of a rebuilding function.

Furthermore, the RAID controller 10 connected to the first disk drive 20 and the second disk drive 21 includes a drive interface (or a microcontroller) connectable to a new disk drive 30. That is, the RAID controller 10 is connected to the disk drive 30 which is the copying target in a state in which redundancy (optimal) is maintained (constitution of RAID-1), and executes a copying operation for copying recording data from the existing first disk drive 20 or second disk drive 21.

(Constitution of RAID Controller 10)

As shown in FIG. 2, the RAID controller 10 has a microprocessor (CPU) 100, a memory 110, a buffer memory 120, a drive interface 130, and a host interface 140.

The CPU 100 is a main control device which executes a RAID control operation including a rebuilding function and a copying function of the present embodiment. The memory 110 includes a ROM in which a program of the CPU 100 is stored, a flash EEPROM, and a RAM. The buffer memory 120 includes a buffer RAM and a cache memory.

The drive interface 130 corresponds to a microcontroller which is connected to a plurality of disk drives 20, 21, 30 and which controls the input/output of the data. In the present embodiment, for example, four disk drives can be connected. The host interface 140 is an interface which controls the transfer of data and commands with respect to a host system (personal computer, server, etc.) in which RAID is used as an external storage device.

It is to be noted that the RAID controller 10 of the present embodiment may be constituted of a hardware logic circuit which exclusively realizes RAID-1 and the copying function instead of other constituting elements excluding the drive interface 130 and host interface 140.

Concretely, in the present embodiment, the RAID controller 10 may be a card-type controller attached to a card slot disposed, for example, in the personal computer and connected to a plurality of disk drives to realize the RAID-1 and copying function.

(Copying Operation)

A duplicating operation (copying operation) of the present embodiment will be described hereinafter with reference to flowcharts of FIGS. 3 and 4.

First, on confirming connection of the disk drive 30 which is a copying target (copy object), the RAID controller 10 starts the copying operation (steps S1, S2). The RAID controller 10 sets, for example, the second disk drive 21 as a disk drive which is the copying target. As shown by a solid line of FIG. 3, data by a unit of a block is read from the disk drive 21, and transferred to the disk drive 30 which is the copying target by a rebuilding function (step S3).

On transferring all the recording data stored in the second disk drive 21 to be copied to the disk drive 30 which is the copying target, the RAID controller 10 completes the copying operation (NO in step S4, YES in S6). Accordingly, when the disk drive 30 as the copying target is detached from the RAID controller 10, a duplicate disk drive can be prepared.

Here, a non-readable area in which the recording data cannot be read from the second disk drive 21 to be copied exists. Then, the RAID controller 10 reads the recording data from a recording area corresponding to the non-readable area from the other, first disk drive 20 of the mirroring constitution, and transfers the data to the disk drive 30 which is the copying target (YES in step S4, S5).

Figure 3:
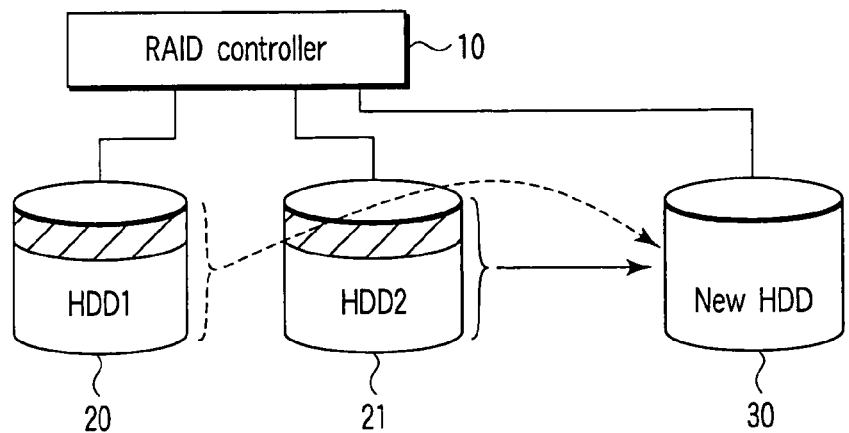
FIG. 3 is an explanatory view of a copying operation according to the present embodiment.
Figure 4:
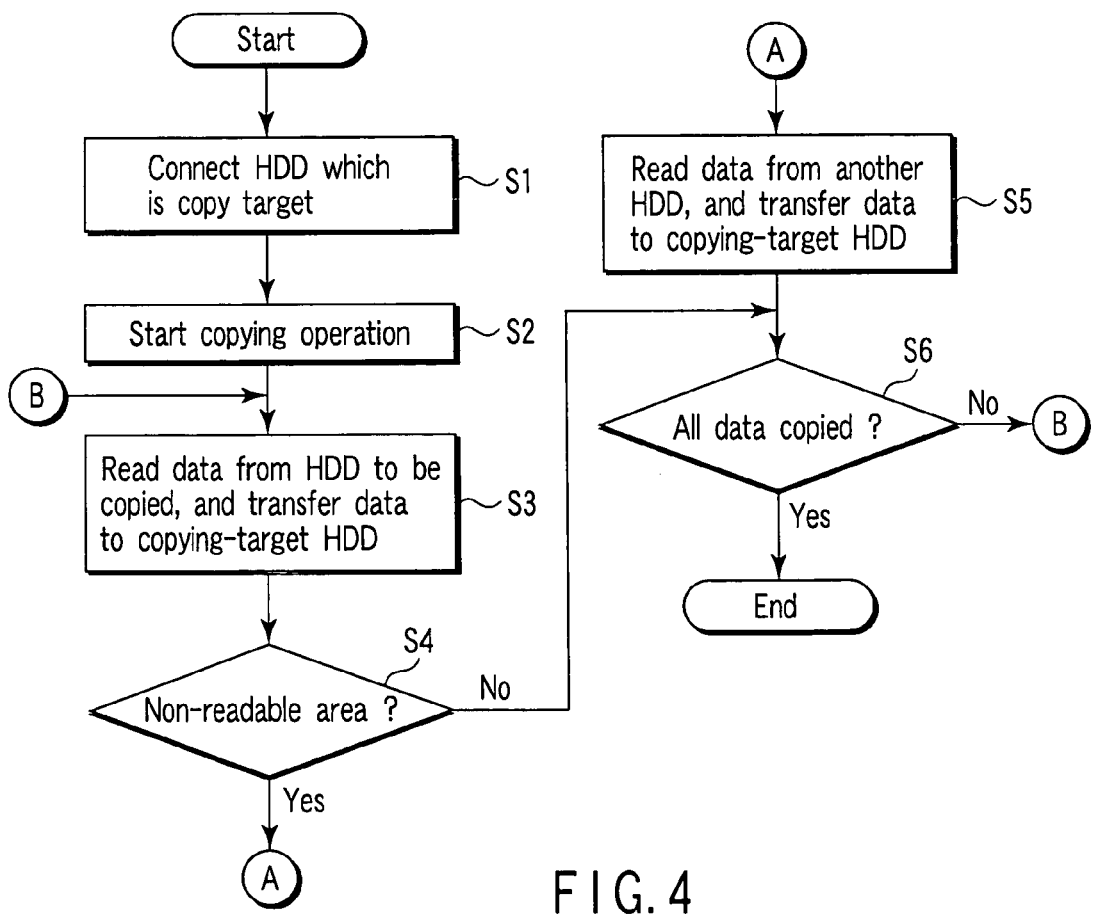
FIG. 4 is a flowchart showing the copying operation according to the present embodiment.

Furthermore, when the second disk drive 21 to be copied fails at the time of the copying operation, as shown by a dotted line of FIG. 3, the RAID controller 10 reads all the same recording data from the first disk drive 20, and copies the data to the copying-target disk drive 30. That is, since the redundancy is maintained in the mirroring constitution, all the recording data can be secured by the first disk drive 20, and a copying operation for copying the data to the copying-target disk drive 30 can be resumed.

As described above, according to the present embodiment, by the use of the rebuilding function disposed in the RAID controller 10, the recording data is read, for example, from the existing second disk drive 21, and copied to the copying-target disk drive 30, so that the disk drive for the copying can be prepared.

In this case, the RAID controller 10 executes a copying process to prepare the disk drive for the copying in a state in which redundancy is maintained in the mirroring constitution. Therefore, the recording data can be read from the other, first disk drive 20 and copied to the copying-target new disk drive 30 in a case where a non-readable area where the recording data cannot be read exists in the copying-target second disk drive 21.

Furthermore, if the second disk drive 21 to be copied fails at the time of the copying operation, the redundancy is maintained in the mirroring constitution, and therefore all the same recording data can be secured by the other, first disk drive 20. The copying operation can be resumed in which the data is copied to the copying-target new disk drive 30 using the first disk drive 20 as the disk drive to be copied instead of the second disk drive 21.

OTHER EMBODIMENT

FIG. 5 is a block diagram according to another embodiment.

As shown in FIG. 5, a RAID controller 50 of the present embodiment is connected to first to fourth disk drives 20 to 23 to constitute a RAID constitution (referred to as RAID-10 for convenience) in which RAID-0 is combined with RAID-1.

Concretely, for example, a first disk drive 20 and a third disk drive 22 realize a striping constitution (RAID-0) in which recording data is scattered by a unit of a block. On the other hand, the first disk drive 20 and a second disk drive 21 realize a mirroring constitution (RAID-1) in which the same data is stored. The third disk drive 22 and a fourth disk drive 23 realize a mirroring constitution (RAID-1) in which the same data is stored.

Even in the RAID-10 constitution, the RAID controller 50 is capable of reading the recording data, for example, from the existing second disk drive 21, copying the data to a copying-target new disk drive 30, and preparing a disk drive for the copying by the use of a rebuilding function. The RAID controller 50 is capable of reading the recording data, for example, from the existing fourth disk drive 23, copying the data to the copying-target new disk drive 30, and preparing a disk drive for the copying.

Even in the present embodiment, when the second disk drive 21 fails at the time of the copying operation, the redundancy is maintained in the mirroring constitution, and therefore all the same recording data can be secured by the other first disk drive 20. Moreover, the copying operation can be resumed in which the data is copied to the copying-target new disk drive 30 using the first disk drive 20 as the disk drive to be copied instead of the second disk drive 21.

Moreover, when the fourth disk drive 23 fails at the time of the copying operation, the redundancy is maintained in the mirroring constitution, and therefore all the same recording data can be secured by the other third disk drive 22. Moreover, the copying operation can be resumed in which the data is copied to the copying-target new disk drive 30 using the third disk drive 22 as the disk drive to be copied instead of the fourth disk drive 23.

In the RAID controller of the present embodiment, the state of redundancy of the RAID is maintained, original data is copied to the copying-target disk drive from the existing disk drive, and the disk drive for the copying can be prepared. Even when the copying-target existing disk drive fails at the time of the preparation of the disk drive for the copying, original data stored in the other existing disk drive can be protected.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A RAID control apparatus comprising:
    an input/output control unit which is connected to first and second disk drives included in a disk array system, and a copying-target disk drive and which controls input/output of data with respect to the first, second, and copying-target disk drives; and
    a copying control unit which reads recording data from a disk drive to be copied which is one of the first and second disk drives and which transfers the data to the copying-target disk drive by use of a rebuilding function of the disk array system,
    wherein the copying control unit judges whether or not a recording area incapable of reading the recording data from the disk drive to be copied exists at the time of transferring of the recording data read from the disk drive to be copied, which is one of the first and second disk drives, to the copying-target disk drive, and transfers the recording data read from the recording area corresponding to that of the other disk drive that is the first or second disk drive to the copying-target disk drive, when the non-readable recording area exists.

2. A method of copying data from a first or second disk drive included in a disk array system to a copying-target disk drive, the first and second disk drives constitute a mirroring constitution in which the same data is stored, the method comprising:
    recognizing connection of the copying-target disk drive;
    reading recording data from a disk drive to be copied, which is one of the first and second disk drives, by use of a rebuilding function of the disk array system; and
    judging whether or not a recording area incapable of reading the recording data from the disk drive to be copied exists at the time of transferring of the recording data read from the disk drive to be copied, which is one of the first and second disk drives, to the copying-target disk drive, and
    transferring the recording data read from the recording area corresponding to that of the other disk drive that is the first or second disk drive to the copying-target disk drive, when the non-readable recording area exists.

* * * * *